United States Patent [19]

Shim

[11] Patent Number: 5,156,011
[45] Date of Patent: Oct. 20, 1992

[54] LOAD OPERATION CONTROL METHOD OF REFRIGERATOR

[75] Inventor: Jae E. Shim, Suweon, Rep. of Korea

[73] Assignee: Samsung Electronics Co., Ltd., Suweon, Rep. of Korea

[21] Appl. No.: 635,698

[22] Filed: Dec. 28, 1990

[30] Foreign Application Priority Data

Dec. 28, 1989 [KR] Rep. of Korea ............. 89-19876

[51] Int. Cl.$^5$ ............. F25D 17/00; G05D 23/00
[52] U.S. Cl. ............. 62/115; 62/180; 236/47
[58] Field of Search ............. 236/47; 62/180, 186, 62/229, 231, 115

[56] References Cited

U.S. PATENT DOCUMENTS 4,807,443  2/1989  Battson et al. ............. 62/231

FOREIGN PATENT DOCUMENTS 0117943  7/1983  Japan ............. 236/47

*Primary Examiner*—William E. Wayner
*Attorney, Agent, or Firm*—Burns, Doane, Swecker & Mathis

[57] ABSTRACT

In an exemplary embodiment of the present invention, a load operation determining portion is provided with a comparator to determine the magnitude of signals from a current sensor for parameters of each of loads, a microprocessor for comparing the signals from the determining portion with a previously set parameter and controlling a load according to the comparison result, and a load driving portion for operating a load according to the control of the microprocessor.

13 Claims, 3 Drawing Sheets

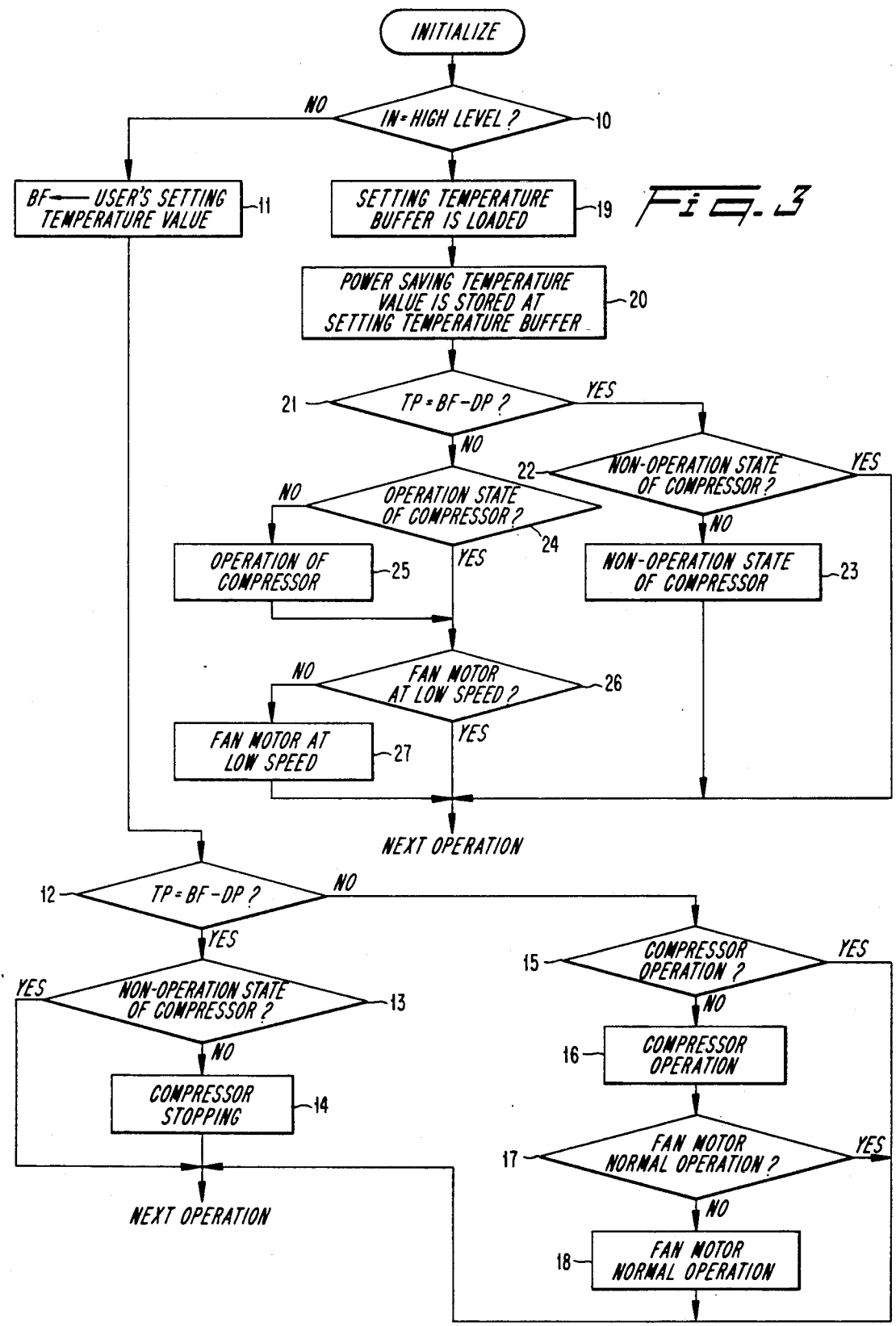

LOAD OPERATION CONTROL METHOD OF REFRIGERATOR

BACKGROUND OF INVENTION

The invention is related to a method for controlling the operation of a refrigerator, and particularly, a control method for controlling the operation of a refrigerator using a current sensor.

Hereinafter, the term 'current sensor' is used to describe any of a plurality of elements having a variable resistance value, such as a photoconductive cell and a thermistor, which is capable of detecting change of the current value according to the variation of its resistance value.

It is well known that the technique of using a current sensor may be adapted to various fields. A typical prior art apparatus is described in Japan Laid-open Utility Model Publication No. Sho 63-78875.

A refrigerator disclosed in Publication No. Sho 63-78875 comprises a high speed freezing apparatus including a freezing compartment, a fresh food storage storage compartment, a compressor and an evaporator of a cooling system, a blow fan for forcibly blowing cooling air into the freezing compartment and the fresh food storage compartment, means for detecting the temperature of external ambient air, and a high speed freezing switch for forcing the compressor and the fan to be operated. In the disclosed apparatus, the external ambient air sensor detects the ambient air temperature at a predetermined time after the actuation of the high speed freezing switch. At that time, if the ambient air temperature is below a predetermined ambient air temperature, the high speed freezing/refrigerating operation of the compressor and blow fan is stopped. If the ambient air temperature is over a predetermined ambient air temperature, the high speed freezing/ refrigerating operation is restarted. However, this prior art refrigerator only adjusts its operation with respect to the high speed freezing/refrigerating function, and does not relate to a technique for controlling the entire system.

Typically, conventional refrigerators have been operated according to functions set by the user which are independent of the frequency of its door use. That is to say, the conventional refrigerator may be properly cooled during the day when refrigerator use is relatively high. The same conventional refrigerator will be overly cooled during the night when refrigerator use is lower. Therefore, the conventional refrigerator has the problem that a large amount of power will be wasted during period of low usage, and during this period the normal operation of the fan motor causes an unnecessary amount of noise due to friction or clashes between a fan wing and air.

In view of these problems, it is known that after any one or a plurality of parameters for a refrigerator are determined, a control system of a refrigerator controls a load corresponding to each of load parameters to be controlled, so that a refrigerator may be effectively controlled.

SUMMARY OF INVENTION

The main object of the invention is to provide a method for determining at least one of a plurality of load parameters and controlling an operation of a load corresponding to each determined load parameter.

Another object of the invention is to provide a load operating control method using a current sensor to control a load that it operates in a power-saving mode during a lower usage period, automatically, thereby reducing the consumption of power of the apparatus.

A further object of the invention is to provide a load operating control method using a current sensor to operate a fan motor at low speed during a lower usage period, thereby decreasing noise created by rotation of the fan.

Thus, an apparatus according to the invention comprises a load operation determining portion provided with a comparator to determine the magnitude of signals generated by a current sensing means for parameters of each of the loads, a control means for comparing signals from the determining portion with the corresponding previously set parameter and controlling a load according to the comparison result, and a load driving portion for operating a load according to the control of the control means.

The method according to the invention comprises the steps of determining the magnitude of signals representing load parameters, comparing the magnitude of the load operation signal with a corresponding previously set parameter, and controlling the operation of a load according to the comparison result.

In a preferred embodiment, the invention judges by an intensity of ambient illumination whether it is currently a high or low usage time period. The sensing of the illumination intensity is accomplished using a photoconductive element capable of varying its resistance value according to the intensity of illumination. If the intensity of illumination is relatively low, a power-saving temperature value is stored in a temperature buffer. The stored power-saving temperature value is compared with the interior temperature of a refrigerator sensed by a temperature sensor. A compressor is operated according to the comparison result, and a fan motor is driven at a low speed to maintain the interior temperature at the power-saving operation temperature.

BRIEF DESCRIPTION OF THE DRAWINGS

The invention will be described in detail by reference to the accompanying drawings, in which;

FIG. 3 is a flow chart illustrating a load operation control method of a refrigerator are based on the intensity of illumination according to the invention.

DETAILED DESCRIPTION OF THE INVENTION

Figure 1:
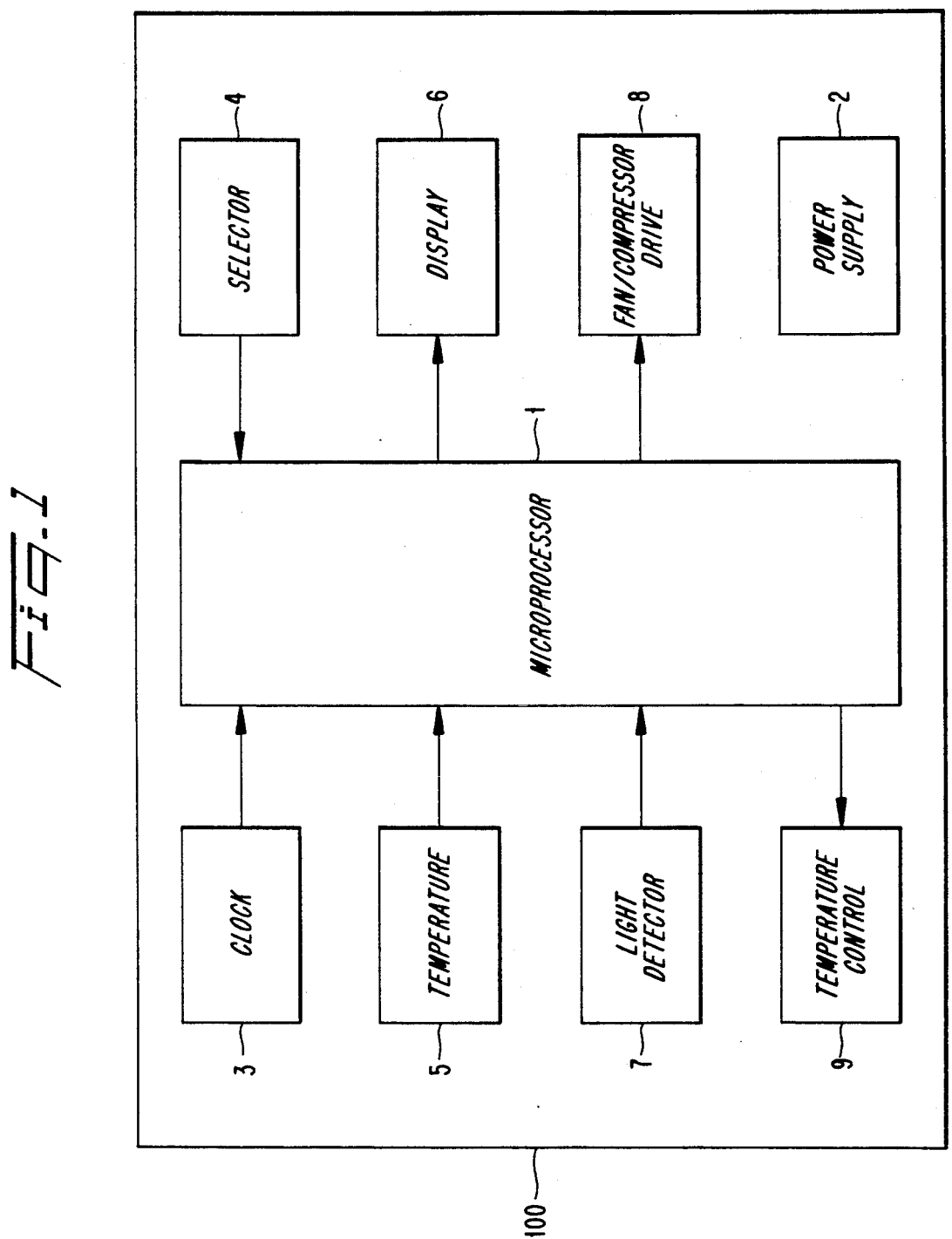
FIG. 1 is a schematic block diagram of a conventional refrigerator adapted according to the invention.

FIG. 1 is a control circuit of a refrigerator adapted according to a load operation control method of the invention. The system comprises microprocessor for controlling all load operations of a refrigerator 100, power source 2 for supplying a driving power source to all loads of the system, clock oscillating portion 3 for providing clock signals to the microprocessor, function selecting portion 4 for selecting any one operation of a refrigerator, temperature detecting portion 5 for sensing the interior temperature of the refrigerator, displaying portion 6 for representing the operating state of a load, illuminating intensity sensing portion 7 for detecting the intensity of ambient illumination around the refrigerator, operating portion 8 for driving a fan motor and a compressor and a temperature control portion 9 for adjusting the temperature of the interior compartments.

The operation of this circuit is as follows. After being plugged in, the power source 2 is applied to all loads of a refrigerator and the clock oscillating portion 3 continuously supplies clock signals to the microprocessor 1. The illuminating intensity sensing portion 7 includes a current sensor which detects the intensity of ambient illumination around the refrigerator and outputs a corresponding signal to the microprocessor 1. Microprocessor 1 determines from the signal from the illuminating sensing portion whether it is currently a high usage period or a low usage period.

During a high usage period, a user can select any of a plurality of functions of function selecting portion 4 and display the selected functions at displaying portion 6. Thereafter, microprocessor 1 drives operating portion 8 to operate a compressor and fan motor, normally, and controls temperature adjusting portion 9 to maintain the interior temperature at a predetermined temperature.

During a low usage period, microprocessor 1 selects the power-saving mode independently of any user selection through function selecting portion 4. The power-saving mode is indicated as being operative on displaying portion 6. Operating portion 8 is operated to cool the interior of the refrigerator to the power-saving temperature according to the control of microprocessor A fan motor is operated at a low speed. As a result, microprocessor 1 controls temperature adjusting portion 9 to maintain the interior temperature at the power-saving temperature and the fan speed is reduced to minimize noise.

Figure 2:
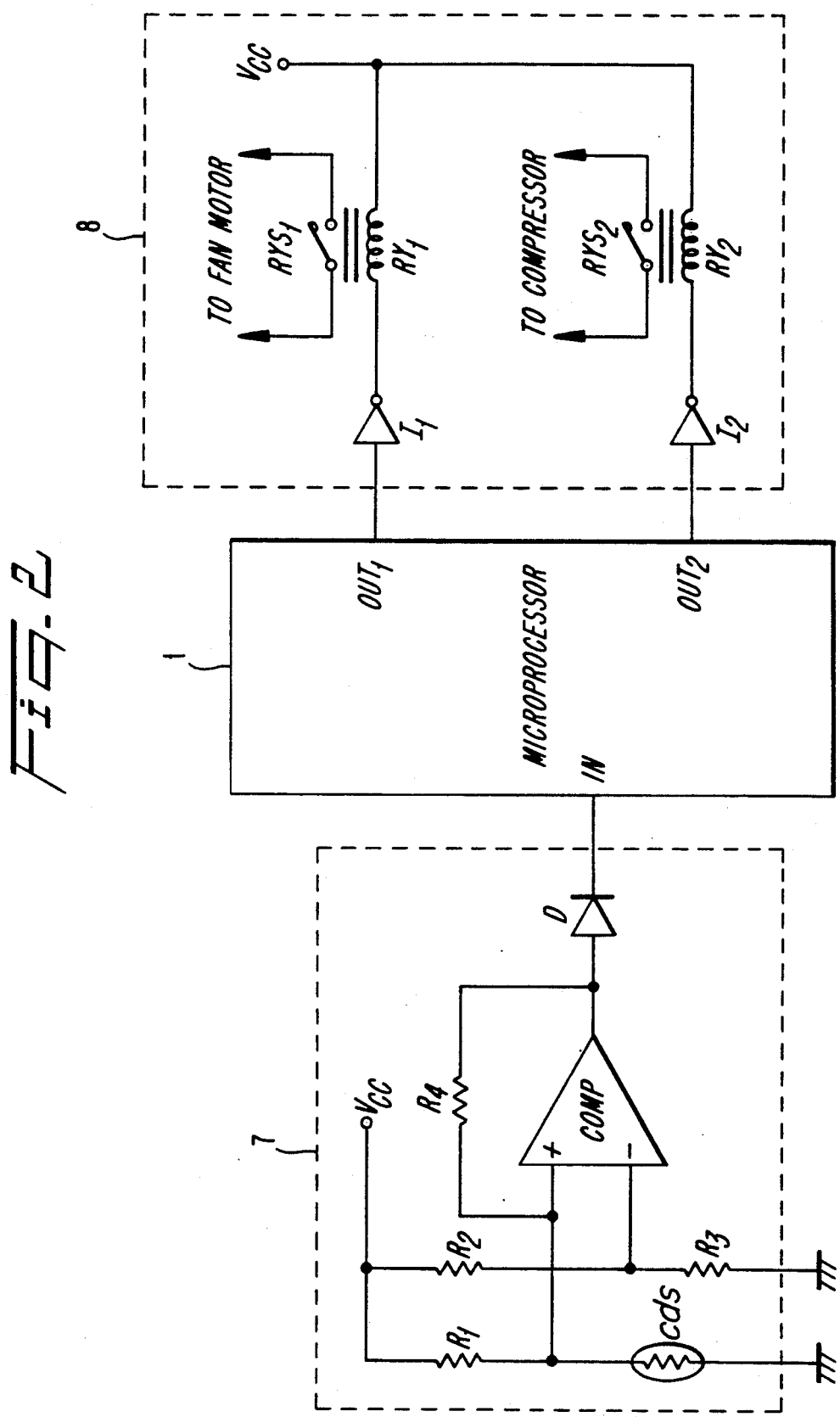
FIG. 2 is a detailed circuit showing an illumination intensity sensing portion and a load operating portion according to the invention.

FIG. 2 is a detailed circuit representing the illuminating intensity sensing portion 7 and operating portion 8.

Illuminating intensity sensing portion 7 is provided with comparator COMP having two terminals, a non-inverting terminal (+) and an inverting terminal (−). Power source VCC is connected to resistor R1 and resistor R2. Resistor R1 is connected in series with photoconductive element cds to ground, and resistor R2 is coupled in series with resistor R3 ground. The connection point between resistor R1 and photoconductive element cds and the connection point VR (hereinafter called the reference voltage) between resistor R2 and R3 are respectively connected to each of the non-inverting terminal (+) and the inverting terminal (−). The output terminal of comparator COMP has resistor R4 fed back to non-inverting terminal (+) and is connected through diode D to input terminal IN of microprocessor 1.

Operating portion 8 is provided with a plurality of inverters and relays. Each of the inverters I1 and I2 shown in the drawing are connected in series to relays RY1 and RY2, respectively. Microprocessor 1 has two terminals OUT1 and OUT2 connected to inverters I1 and I2, respectively. Each of relays RY1 and RY2 has relay switches RYS1 and RYS2 electrically connected to a fan motor and a compressor (not shown), respectively, Relays R1 and R2 are also connected in common to power source VOC.

Herein, it is assumed that illuminating intensity sensing portion 7 and operating portion 8 are applied to power source VCC. The voltage applied to non-inverting terminal (+) of comparator COMP is lower than reference voltage VR divided by resistors R2 and R3, if the resistance value of photoconductive element cds is a relatively low due to the high intensity of illumination during the high usage period. At that time, comparator COMP outputs a low level signal through diode D to input terminal IN of microprocessor 1. Microprocessor 1 judges by the low level signal that it is currently a high usage period.

On the contrary, during a low usage period when the ambient illuminating intensity around a refrigerator is relatively low, the resistance value of photoconductive element cds is relatively high. At that time, the voltage applied to non-inverting terminal (+) is higher than reference voltage VR, and comparator COMP supplies a high level signal through diode D to input terminal IN of microprocessor 1. Microprocessor 1 judges by the high level signal that it is currently a low usage period.

In accordance with the method set forth below with respect to FIG. 3 the microprocessor 1 controls the operating portion as follows. When microprocessor 1 outputs a high level signal at its output terminal OUT1, inverter I1 supplies a low level signal to relay RY1. Relay RY1 is energized to close relay switch RYS1 for operating a fan motor. When microprocessor 1 outputs a high level signal at its output terminal OUT2, inverter I2 supplies a low level signal to relay RY2. Relay RY2 is energized to close relay switch RYS2 for operating a compressor.

FIG. 3 is a flow chart illustrating a load operation control method according to the invention.

A load operation control method is started after the initialization of the system. At step 10, microprocessor 1 judges whether it receives a low level signal at input terminal IN; that is, whether a high usage period currently exists. If it is a high usage period, step 10 goes on step 11 to store the temperature value selected by a user through the function selecting portion 4 in temperature buffer BF. Next, at step 12, microprocessor 1 compares the interior temperature TP sensed by temperature detecting portion 5 with the temperature value that results when a hysteresis temperature value DP is subtracted from the temperature value stored at buffer BF. If these values are equal to each other to satisfy the equation $TP = BF - DP$, step 12 goes onto step 13 to judge whether the compressor is stopped. If the compressor is still running, it is stopped at step 14. However, if the microprocessor determines that the interior temperature is not equal to the result of $BP - DP$, step 12 proceeds to step 15 to determine whether the compressor is running. If the compressor is not running, step 15 moves to step 16 to start the compressor. At step 17, the microprocessor determines whether or not the fan is running. If not, at step is the fan motor is operated at normal speed.

If the potential at input terminal IN of microprocessor 1 is at the high level indicating that it is currently a low usage period, step 10 moves to step 19 which indicates that the temperature value set by the user is stored at temperature buffer BF. Next, at step 20 power-saving temperature BF is stored as the temperature value set by the user at a buffer. At step 21, microprocessor 1 compares the interior temperature TP sensed by temperature detecting portion 5 with the temperature value that results when a hysteresis temperature value DP is subtracted from the power-saving operating temperature value stored at buffer BF. At that time, if the equation $TP = BF - DP$ is satisfied, step 21 goes to step 22 to determine whether the compressor is running. If it is running at step 23, the compressor is stopped. If the equation $TP = BF - DP$ is not satisfied, step 21 moves to step 24 to determine whether the compressor is running.

If not, the compressor is started at step 25. If the compressor is already running, step 21 jumps to step 26 to determine whether the fan motor is driven at a low speed. If not, the fan motor is operated at a low speed at step 27.

As described above, the invention automatically performs a power-saving operation during the night time or bed time and operates a fan motor at a low speed in order to both reduce the power consumption as well as to decrease noise caused by the rotation of the fan. Although a preferred embodiment of the invention has been described above, it will be appreciated that other forms of control can be included. For example, the invention can also be used to additionally control the corresponding loads of a refrigerator using detected signals related to the load parameters to be controlled.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Method for controlling temperature in a refrigerator having a normal mode of operation and a power-saving mode of operation comprising the steps of:
   detecting illumination intensity in a vicinity of the refrigerator; and
   selecting one of the normal mode of operation or the power-saving mode of operation in response to said illumination intensity, said power-saving mode having load requirements which are less than load requirements of said normal mode; and
   operating the refrigerator in the selected one of said normal mode or said power-saving mode.

2. Method according to claim 1, wherein said operating step further comprises the steps of:
   sensing load requirements of the refrigerator;
   comparing said load requirements with a command signal to produce a difference signal;
   adjusting said load requirements in response to said difference signal.

3. Method according to claim 2, wherein said step of sensing further includes the step of:
   detecting refrigerator temperature in an interior portion of the refrigerator which is not continuously exposed to the ambient illumination.

4. Method according to claim 2, further comprising the step of:
   setting said command signal in response to a temperature command signal.

5. Method according to claim 2, wherein said step of selecting said power-saving mode further includes the step of:
   determining that said ambient illumination intensity has fallen below a predetermined level, said predetermined level being indicative of low activity periods during which a temperature controlled portion of the refrigerator is exposed to said ambient illumination with less frequency than occurs during said normal mode.

6. Method according to claim 4, wherein said temperature command signal corresponds to a first level during said normal mode, and corresponds to a second level during said power-saving mode, said second level being less than said first level.

7. Method according to claim 3, wherein said step of operating further includes the step of:
   generating signals for driving a compressor and a fan motor to maintain said interior refrigerator temperature at the command temperature.

8. Method according to claim 7, wherein said step of driving further includes the step of:
   generating signals for reducing fan motor speed and stopping the compressor during a power-saving mode.

9. Method according to claim 4, wherein said step of setting further includes a step of:
   subtracting a hysteresis temperature value from said temperature command signal.

10. Apparatus for controlling power consumption of a refrigerator comprising:
    a function selector for selecting a desired interior refrigerator temperature;
    a temperature detector for detecting actual interior refrigerator temperature;
    a comparator for comparing said actual interior refrigerator temperature with said desired interior refrigerator;
    an ambient illumination sensor for detecting an ambient illumination level in a vicinity of the refrigerator; and
    a controller for adjusting power consumption of the refrigerator in response to an output of the comparator and the ambient illumination sensor.

11. Apparatus according to claim 10, wherein said ambient illumination sensor is a photoconductive element.

12. A load operation control method for a refrigerator comprising the steps of:
    detecting an ambient illumination intensity in a vicinity of the refrigerator;
    loading a user-selected temperature value in a temperature buffer;
    subtracting a hysteresis temperature value from the user-selected temperature value stored in the temperature buffer to produce a subtracted value;
    comparing an interior refrigerator temperature value detected by a temperature detector with the subtracted value to produce a temperature control signal;
    controlling a compressor and fan of the refrigerator in response to said temperature control signal and said detected ambient illumination intensity.

13. Method according to claim 12 wherein said ambient illumination intensity is used to select between a power-saving mode and a normal mode of refrigerator operation, a magnitude of said ambient illumination being lower during a power-saving mode.

* * * * *